March 28, 1944.    T. A. RICH    2,345,430
DIRECT CURRENT TRANSFORMER
Filed Dec. 9, 1942    2 Sheets-Sheet 1
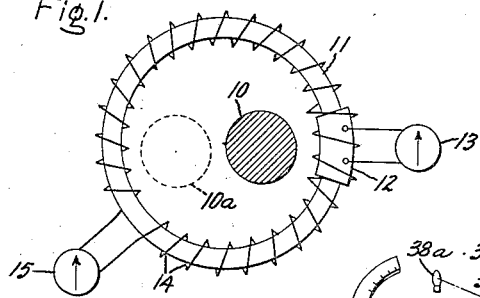
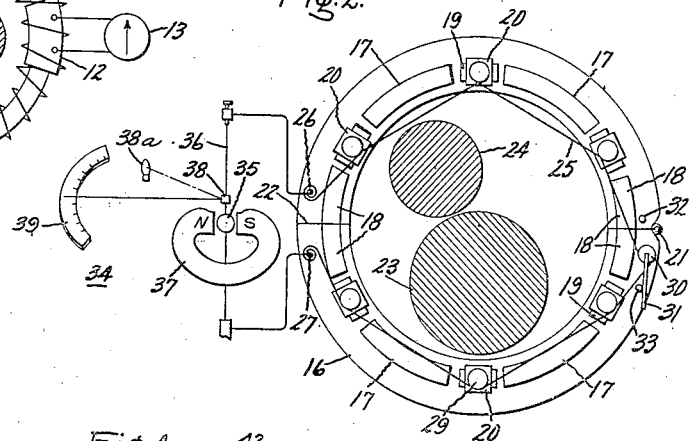
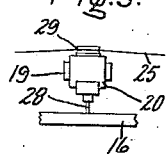
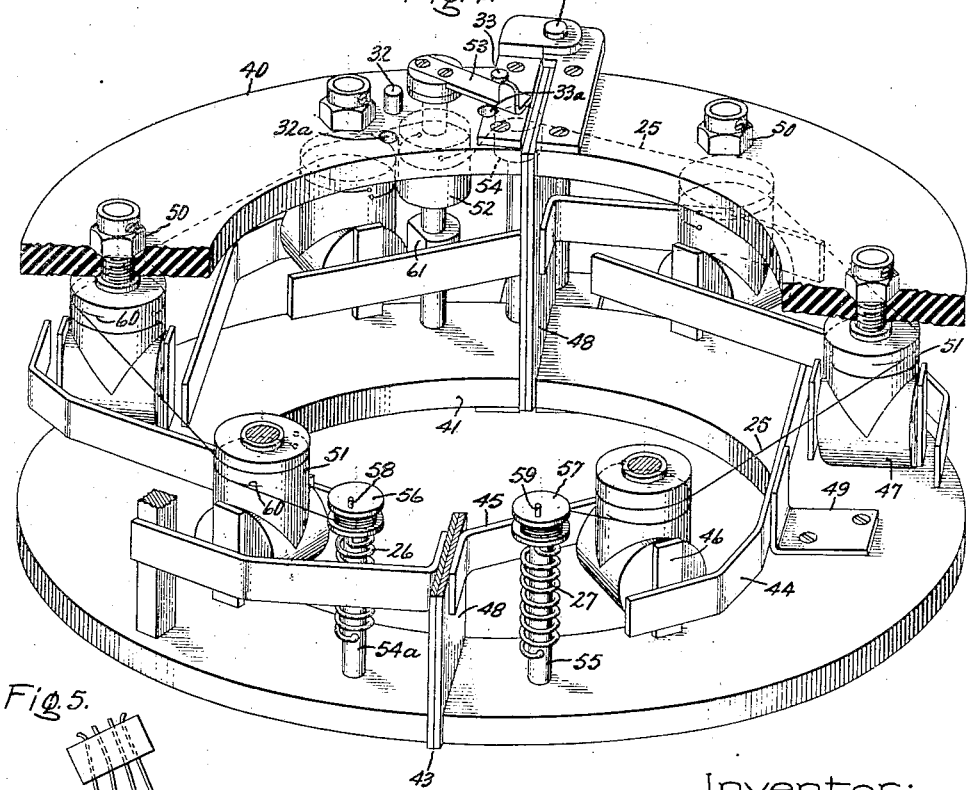
Inventor:
Theodore A. Rich,
by Harry E. Dunham
His Attorney.

March 28, 1944.  T. A. RICH  2,345,430
DIRECT CURRENT TRANSFORMER
Filed Dec. 9, 1942  2 Sheets-Sheet 2

Inventor:
Theodore A. Rich,
by Harry E. Dunham
His Attorney.

Patented Mar. 28, 1944

2,345,430

UNITED STATES PATENT OFFICE 2,345,430

DIRECT CURRENT TRANSFORMER

Theodore A. Rich, Schenectady, N. Y., assignor to General Electric Company, a corporation of New York Application December 9, 1942, Serial No. 468,337

9 Claims. (Cl. 171—95)

My invention relates to the measurement of direct current and is particularly useful where the current to be measured is large and flows in a large conductor or conductors, for example, a current of 2000 or 30,000 amperes flowing in a conductor six to twenty inches in diameter or the equivalent. The conventional way of measuring large direct currents is to connect a resistance shunt in the circuit and measure the drop in voltage across the shunt. For larger currents the shunt necessary for such measurements becomes extremely large, heavy and expensive. An important object of my invention is to reduce the size, weight and cost of the apparatus and also to avoid the necessity of breaking the heavy conductor circuit for a measurement connection such as is required for inserting a shunt.

Figure 6:
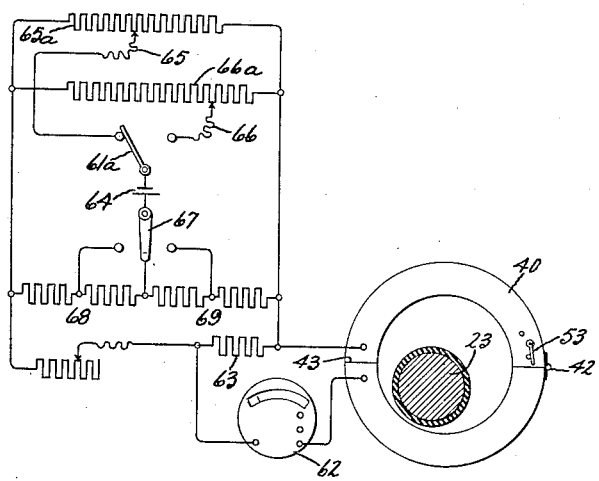
Figure 7:
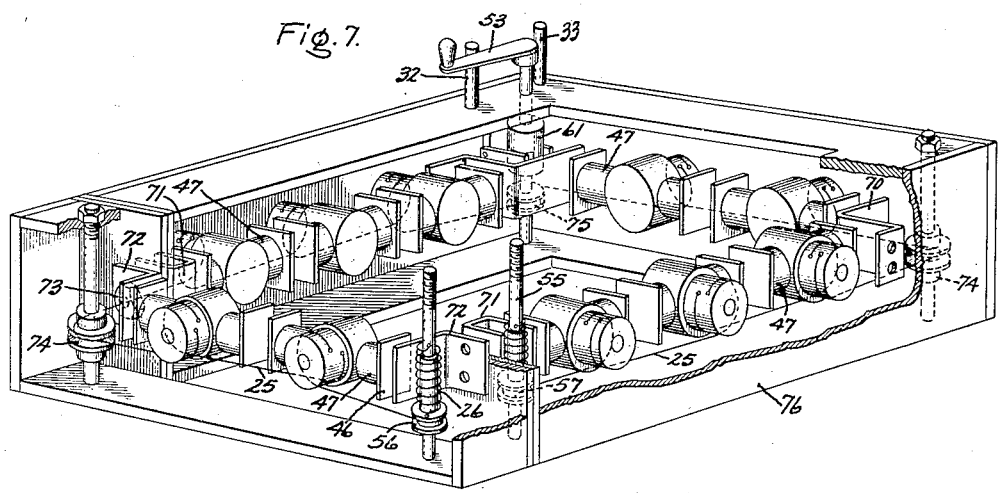
Figure 8:
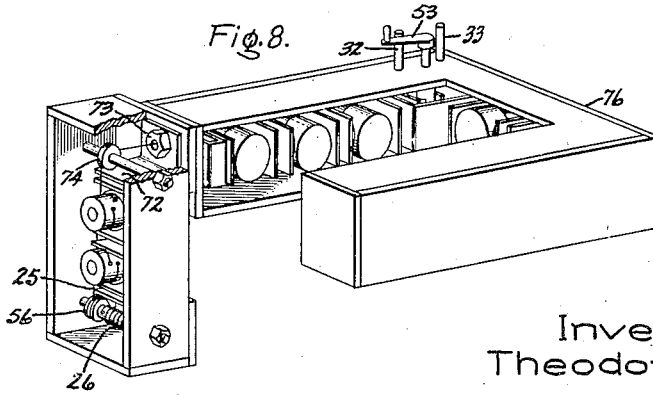

In carrying my invention into effect I employ what might be called a direct current hook-on transformer in which the primary winding carries the direct current to be measured and the transformer effect is obtained by reversals of the secondary winding. Also, the secondary winding is made up of several coils which are distributed about the primary in such a way as to make the transformation ratio independent of any exact relative positioning of primary and secondary windings. These and other features will be explained in connection with the accompanying drawings in which Fig. 1 is an explanatory diagrammatic representation of an alternating current transformer, Fig. 2 a corresponding representation of my direct current transformer, Fig. 3 is a side view of one of the reversible coils of Fig. 2, Fig. 4 is a perspective view with the top wall partly broken away of a preferred embodiment of my invention for measuring moderately high direct currents, say up to 3000 amperes, Fig. 5 represents a two-way switch used with the transformers of Figs. 4 and 7, Fig. 7 represents another embodiment of my invention having a generally rectangular core structure, Fig. 8 shows the transformer of Fig. 7 open for the reception of the primary, and Fig. 6 is a circuit diagram of an instrument torque nullifying system which enables inexpensive rugged direct current measuring instruments to be used with my invention.

If, in Fig. 1, 10 represents a conductor carrying an alternating current, it will produce a flux surrounding the conductor proportional to the current flowing. The flux produced may be largely confined to a definite path about the cable by the use of a magnetic core 11. If a coil 12 be wound on one side of the core we have an alternating current transformer and a secondary current will flow in the secondary coil which may be measured on an instrument 13. Such a transformer will have somewhat different transformation ratios, depending upon the position of the primary 10 with respect to the coil 12. For example, if the primary be moved to the dotted line position 10a, the transformer ratio will be different than before. Such a transformer has what may be termed a position error, meaning that unless the conductor primary 10 is always placed in the same position with respect to the secondary coil 12 error in transformation ratio will result. This type of error may be corrected by distributing the secondary winding uniformly about the core as represented by the secondary winding 14 which is connected to the instrument 15. Thus, if we use secondary coil 14 the transformer will have no error due to various different positions of primary conductor 10. This distributed secondary coil principle is used in my direct current transformer to the extent necessary to avoid position errors.

In Fig. 2 I have shown a base or supporting structure 16 on which is mounted a magnetic core structure divided up into 14 segments, four long segments 17, four medium length segments 18, and six relatively short segments 19. The segments 19 are uniformly distributed about the circle of segments and wound thereon are coils 20 constituting the secondary winding. I have found that six coils distributed as shown in a circle provide a sufficient distribution of the secondary winding to avoid any noticeable position error. The transformer base and core structure is provided with facilities such as being hinged at 21 so as to be swung open at 22 to close around and embrace the primary conductor or conductors represented at 23 and 24, for the purpose of avoiding any necessity of cutting or otherwise breaking the primary circuit in order to couple the transformer in measuring relation therewith. The several coils 20 are connected in series to produce transformer voltages in the same direction in the series circuit by a flexible conductor wire 25 having terminals at 26 and 27. The transformer as thus far described may be used as a split core alternating current transformer of zero position error by connecting a suitable alternating current measuring instrument across terminals 26 and 27 and by suitable calibration. Owing to the several air gaps in the core, a percentage of the primary flux will be leakage flux and the transformer will not have the ratio for a given number of turns in the secondary winding that would be expected from a continuous core transformer such as shown in Fig. 1, but this is immaterial since it will have a constant ratio within the current range for which it is designed. Collectively the coils will intercept the same percentage of total flux regardless of the position of the embraced primary conductor.

There will, of course, be no transformer action if a uniform direct current flows in the primary conductors 23 or 24 or both and I will now explain the features by means of which the transformer can be used for measuring direct current. Each of the six small core segments 19 with their coils 20 are pivoted on their centers on posts 28 which rise from the base 16 as shown in Fig. 3. The wire cable 25 which connects the coils in series is also partially wrapped about and secured to small grooved drums 29 concentric with the axis of rotation of the coils and here represented as being located on the tops of the coils. This wire is also secured in driving relation with a driving drum 30 near the hinge 21. The driving drum is provided with a handle 31 by means of which it may be rotated sufficiently to simultaneously rotate all of the pivoted coils and cores by 180 degrees. The cable wire 25 is kept taut by means of spiral springs secured between the supporting structure and the ends of the cable and constituting or associated with the terminals at 26 and 27. The wire 25 is connected through connectors in the drum structure 29 in series with the corresponding coils. It is thus seen that by rotating the drum 30 from the position shown, counterclockwise about 180 degrees against the stop 32, all of the pivoted coils and cores will be rotated 180 degrees, which is the equivalent to reversing the secondary winding. Such operation tensions the springs 26 and 27 so that when the handle 31 is released it snaps back against a stop 33 and again reverses the secondary winding. When the coils are thus reversed the flux in the core produced by current flow in primary 23 and 24 reverses its direction through the several secondary coils and produces a voltage impulse which is proportional to the primary current. If, now the secondary winding be connected in series with a flux meter galvanometer 34, such galvanometer will deflect by a corresponding amount and may be calibrated in terms of primary current flow.

The ballistic galvanometer represented in Fig. 2 is of the suspension type having a moving coil 35 suspended by a torsional wire 36 which also serves to conduct current to the moving coil. This coil is located in the field of a permanent magnet 37. The deflection is indicated by a mirror 38 secured to wire 36 and reflects a light beam from a light source 38a to a calibrated scale 39. The galvanometer will deflect in one direction when the handle 31 is rotated counterclockwise and in the opposite direction when the handle is released and rotates in the opposite direction. The rapidity at which the secondary winding is thus reversed does not influence the magnitude of deflection of the galvanometer as long as a certain, easily attained, speed is exceeded. Hence the apparatus may be calibrated to accurately measure direct current flow in the cable or cables 23 and 24 and will also show the direction of such flow.

For use outside of the laboratory I prefer to use a more rugged type of measuring instrument as will be explained in connection with Figs. 4 and 6.

Fig. 4 represents more clearly the actual construction of a direct current transformer similar in principle to that of Fig. 2. It comprises upper and lower base or supporting structures 40 and 41 which may be made of hard rubber insulation board or the like, hinged at 42 so as to open at 43 to enclose the primary cables without cutting the same. The core structure comprises stationary strips of magnetic material 44, 45 and pivoted magnetic core parts 46 on which the several coils 47 are wound. At the joints of the hinged structure the core strips 45 are provided with facing strips 48 secured to frame plates 40 and 41 and designed with a view of providing suitable rigidity to the structure. All core parts 44 are suitably supported from the frame plates 40 and 41 as shown at 49. The core parts 44 and 45 are bent to provide radial aligned pole faces opposite the pivoted core parts 46 so that the stationary axial positions of the pivoted coils and their cores are radial as illustrated. The air gaps are made sufficient to allow the pivoted core parts to swing freely in reversing. 50 represents the pivot posts for the several coils and 51 their driving drums. The manually operated driving drum and operating handle are shown at 52 and 53 respectively. An idler pulley 54 is provided near the hinge 42 for guiding the wire 25. 32 and 33 are the stop posts which limit the throw of handle 53 and exactly position the coils in their reversed positions. These positions should be such as to intercept equal fluxes for a given current flow in the primary. The tensioning springs 26 and 27 for wire 25 are coiled about and secured to posts 54a and 55. At the upper ends of these posts are pivoted small drums 56 and 57 to which the free ends of the springs are fastened and the terminal ends of wire 25 are wrapped a few times about and secured to these drums and brought out to terminals 58 and 59 on their tops and are connected by flexible leads to terminals on the broken away part of the upper support 40, see Fig. 6.

It will be observed that the arrangement of the wire 25 and the various drums over which it rides is such that the hinged core structure can be swung wide open and closed again without disturbing such wire cable driving arrangement or interfering with the insertion of a cable. When the core is opened the wire 25 may be tensioned slightly but the spiral spring at 27 yields to prevent undue strain on the wire. The drums 51 are preferably slightly grooved as shown at 60 to keep the wire 25 in place regardless of any position in which the transformer device might be oriented when in use. On the shaft of driving drum 52 I have provided a cam 61 for operating a switch shown in detail in Fig. 5, the purpose of which will be explained in connection with Fig. 6.

The measuring instrument which I prefer to use, particularly for field service, is an ordinary sensitive moving coil direct current measuring instrument having a pointer and scale. Such instruments have spirals serving as lead-in terminals to the moving coil and hence some restoring torque is unavoidable. However, for measuring flux it is desirable that the moving element of the measuring instrument have no restoring torque to cause drift of the pointer when a reading is being taken, and hence I arrange to pass very small auxiliary currents through the instrument for the purpose of annulling whatever restoring torque or tendency of the pointer to drift may exist at any desired part of the scale. The deflection produced by the flux measurement desired may then be accurately read at leisure, using a rugged instrument suitable for portable field service. Although not a true fluxmeter, its behavior is made to correspond substantially to that of a fluxmeter by counteracting its small spring torque with an equivalent electrodynamic torque at various different deflections in the manner now to be explained.

Referring now to Fig. 6, my improved hinged core, direct current transformer with zero position error is shown at the right with its secondary winding connected to an ordinary sensitive direct current measuring instrument 62 such as mentioned above through a low resistance 63. Resistance 63 is connected across a resistance bridge circuit supplied by a low voltage battery 64 by means of which various selected small voltages may be impressed across resistance 63 to send corresponding small currents through instrument 62 to annul the torque of its lead-in spirals, to prevent drift of the pointer both at zero and up-scale deflection points and to return the pointer to zero as and when desired.

The double throw switch shown at 61a represents the switch shown in Fig. 5 which is located in the transformer and is operated by the handle 53 when the secondary winding of the transformer is reversed. It is shown out of location in Fig. 6 to clarify the circuit connections.

Assume that direct current is flowing in the cable 23, Fig. 6. Then when handle 53 is thrown in one direction instrument 62 will deflect in one direction and when it moves in the opposite direction instrument 62 will deflect in the opposite direction. Assuming that instrument 62 had no torque of any kind at any point of the scale and the current in cable 23 was constant, the up-scale deflection of instrument 62 would be of the same amount as the down-scale deflection and could be read at leisure. For convenience in reading the instrument, one of these deflection points, say the down-scale point, should correspond to the zero of the scale. Since the instrument used has a weak spring torque, the zero of the scale may not exactly correspond to the no torque position of the pointer. In this case resistance tap 65 is adjusted until just enough current of the proper direction is sent through instrument 62 to position the pointer on the zero of the scale with the handle 53 positioned for the down-scale deflection. Switch 61a is at this time closed to connect the bridge through resistance arms 66a. Handle 53 is now thrown to reverse the transformer secondary, causing instrument 62 to deflect up-scale and closing switch 61a on resistance branch tap 66. If the pointer of instrument 62 now starts to drift one way or the other, tap 66 is adjusted along resistance 66a to restore the pointer position to that of the true deflection as near as possible. In other words, the spring torque of the instrument is annulled for this approximate up-scale deflection. The measuring operation is then repeated and if there is no drift of the pointer either at zero or up-scale the reading obtained is a correct one for the particular value of current flowing in cable 23 at the time. If there is further drift, a further minor adjustment of the resistance may be made and the measurement repeated. An exact balance is not necessary if the reading is taken promptly.

With such an instrument and drift annulling arrangement the movement of the pointer to zero, with the proper adjustment of tap 65, will be slow and occasions will arise when a prompt zero setting will be desirable. For this purpose I provide the switch 67 which varies the connection of battery 67 along bridge resistance legs 68 and 69. By operation of switch 67 between the three taps shown, the pointer of instrument 62 may be quickly restored to the zero of the scale. It will, of course, be necessary to use different adjustments of tap 66 for each value of current measured and corresponding different measurement deflections unless the difference is so small that the deflection can be read before there is any erroneous drift of the pointer.

As is known, the calibration range of instrument 62 may be changed in the usual way and three alternative terminals are represented for this purpose. Scale ranges for 100, 500 and 2000 amperes full scale are recommended. The very small currents which are passed through instrument 62 for annulling drift are of course passed through the secondary winding of the transformer but this has no effect on the accuracy of the measurements made. Another way of changing the calibration is to only partially reverse the transformer secondary coils. Thus stop posts may be placed in holes 32a and 33a to limit the throw of handle 53 and the flux intercepted by the coils accordingly.

Apparatus such as shown in Fig. 4 has been built with an internal clearance for the primary winding cables of about seven inches diameter, has a useful current measurement range of from 20 to 2000 amperes and weighs 8 pounds. It will be noted that in the apparatus of Fig. 4 the core is of relatively small cross-section and contains numerous air gaps. Such reduction in magnetic core material may be carried to the point of having no core material other than that on which the reversible coils are wound or even to a complete air core. For example, in Fig. 2 all of the unwound core parts 17 and 18 may be removed with the only effect of reducing the transformation ratio. Direct current transformers for measuring current up to 80,000 amperes have been so designed with good accuracy and complete air core transformers are included within the scope of my invention. This feature has the important advantage of reducing the cost and weight of the transformer.

In Fig. 7 I have shown another embodiment of my invention which gives satisfactory results and is particularly useful where the heavy primary conductors or bus bars are of rectangular shape or are disposed so as to be best encircled by a rectangular shaped transformer core assembly. Here the rectangular cable opening may be say six by twelve inches with three coils 47 on each of the long sides and two coils on each of the shorter sides. Stationary core parts 70, 71 and 72 are necessary only at the corners. In this modification the core assembly is opened to slip over the primary cables by hinging the near end on a bolt 73 extending through the core parts 71 and 72 at the left corner. The core assembly is opened in the manner represented in Fig. 8 by turning the end section either up or down, whichever is most convenient. The series connecting wire and reversing cable 25 passes through a central axial opening in bolt 73. An idler pulley 74 with its periphery in line with the pivot is provided at this corner for wire 25 and at the opposite corner as shown. The driving drum 75 and coil reversing handle 53 and the cam operated switch 61 are located at the rear solid corner of the assembly. A rectangular framework structure 76 made up of boards of any suitable nonmagnetic material such as fiber board, hard rubber or the like is used to support, protect and house the parts as represented. Such transformer structures are relatively light in weight and easy to handle but are also of rugged construction, suitable for portable field service and use by ordinary metermen.

Any of these devices can be used to indicate change in direct current without moving parts. For example to measure the current in a D. C. line that can be interrupted a device similar to Fig. 2 may be used without any iron core. The switching arrangement of Fig. 6 can then be actuated by a relay when the line is switched on for example. As soon as steady current is attained (which usually will be seconds or fractions of a second) a second switch can be flipped to cut off the transformer. The calibration obtained by reversing the coils will indicate ½ the correct current. This type of instrument will prove valuable where short time currents are used, such as in magnetizing magnets and where the conventional instrument will not respond rapidly enough.

What I claim as new and desire to secure by Letters Patent in the United States is:

1. A direct current transformer comprising a supporting structure having an opening therethrough and provided with facilities whereby it may be opened and closed for the purpose of embracing an electric cable within such opening without breaking such cable, a plurality of coils supported on said structure and substantially uniformly distributed about the opening in the structure in a manner to collectively intercept a predetermined amount of flux produced by current flow through such an embraced cable, said coils being pivoted on said structure to permit them to be turned and reversed with respect to the direction of such flux interception, said coils being connected in series to form a secondary winding and means for simultaneously reversing all of said coils.

2. A direct current transformer comprising a supporting structure having a cable opening therethrough, said structure being made in relatively movable sections whereby it may be opened and closed for the purpose of embracing an electric cable within such opening without breaking the cable, a plurality of coils supported on and substantially uniformly distributed about the cable opening in the structure so as to collectively intercept a predetermined amount of flux produced by current flow through such embraced cable regardless of the exact position of such cable within the opening, said coils being pivoted on said structure to permit them to be rotated and reversed with respect to the direction of such flux interception and so that they will intercept equal portions of such flux in either of the reversed positions, a cable system connected with all of said coils for reversing all of the pivoted coils simultaneously, the cable of said system being of conducting material and serving to connect all of said coils in series as a secondary winding.

3. A direct current transformer comprising a supporting structure having an opening therethrough for the reception of an electric cable, magnetic core means on said structure disposed to provide a path for flux around said opening, substantially uniformly distributed sections of said core means being pivoted on said structure and rotatable thereon so that they may be reversed in the flux circuit to reverse the relative direction of flux flow through the pivoted core sections, coils wound on said pivoted core sections, means connecting all of said coils in series as a secondary winding, and means for simultaneously reversing all of said pivoted core sections.

4. A direct current transformer comprising a two-part supporting structure containing a conductor opening, a hinge between the two parts of said structure whereby the structure may be opened for the purpose of embracing a conductor within the opening of the structure without breaking the conductor, a plurality of coils supported on the two parts of said structure and substantially uniformly distributed about the conductor opening when the structure is closed, said coils being pivoted on said structure and rotatable between reversed direction, flux intercepting positions with respect to flux produced about said conductor opening by reason of current flow through a conductor therein, a reversing drum for each pivoted coil, an operating drum located on one part of said structure, cable means passing about all of said drums such that when the operating drum is rotated all of said coils are rotated and reversed simultaneously and spring means for maintaining said cable means taut, said cable means passing from one part to the other of said structure near the hinge thereof so as not to interfere with or be damaged by the opening and closing of said structure.

5. A direct current transformer comprising an annular ring-shaped supporting structure split into two halves and with the halves hinged together so that they may be opened and closed to embrace a current-carrying conductor without breaking the conductor, three coils on each half of the structure, the six coils being substantially uniformly distributed in a circle about the ring-shaped structure when it is closed, said coils being pivoted on the structure so that they may be rotated between reversed direction flux intercepting positions with respect to flux produced by current flow in a conductor embraced by said structure, said coils having magnetic cores to assist in directing such flux therethrough, a circuit connecting said coils in series as a secondary transformer winding, grooved drums attached to said coils coaxial with their pivots, a driving drum, a cable system in driving relation with all of said drums whereby the coils may all be reversed simultaneously, the cable of said system passing from one half to the other half of the structure adjacent the hinge thereof, whereby such cable system does not interfere with the opening and closing of said structure, said cable also comprising the series circuit connection between said coils, and springs secured between said structure and ends of said cable system to maintain the latter taut.

6. A direct current transformer comprising a hollow rectangular supporting structure one side of which is pivoted so as to be swung to open the structure in order that current-carrying conductors may be embraced within the hollow rectangular structure without breaking the cable, a plurality of coils distributed around the structure so as to collectively intercept a definite proportion of the flux produced by current flow in an embraced conductor regardless of the position of such conductor within the structure, said coils being pivoted on the structure so that they may be reversed with respect to the direction of such intercepted flux, means carried by said structure for reversing all of said coils simultaneously and for electrically connecting all of said coils in series, and magnetic core sections carried by said structure including cores for said coils forming a flux path about said structure through the coils.

7. Apparatus for measuring direct current comprising in combination with a conductor carrying the current to be measured, a supporting structure loosely embracing said conductor and adapted to be placed and removed from such embracing relation without breaking the conductor, magnetic core sections supported on said structure providing a path for flux produced by current flow in the embraced conductor, substantially uniformly distributed core sections which are included in such flux path being pivoted on said structure and carrying coils whereby the pivoted sections may be reversed in the flux path to reverse the flux through said coils, means for reversing all of said pivoted core sections simultaneously, and a direct current measuring instrument connected in series relation with said coils for indicating the magnitude of current flow in said conductor in response to the flux reversal through said coils.

8. Apparatus for measuring unidirectional flux comprising a winding for intercepting the flux to be measured, means for reversing the relative direction of such flux interception by said winding to induce an electromotive force in said winding proportional to the intercepted flux, a direct current deflection type measuring instrument connected in series with said winding, said instrument having a torque which varies with deflection other than that produced by electrical energization thereof, adjustable means including a direct current source of supply for electrically energizing said instrument so as to nullify the last mentioned torque at selected different deflections of said instrument, and switching means operated with said reversing means for controlling the application of such torque nullifying energization.

9. Apparatus for measuring large direct currents comprising in combination with a cable in which the direct current to be measured flows, a winding inductively associated with said cable so as to intercept a flux produced by and proportional to such current flow, a moving coil direct current deflecting type measuring instrument, having spiral leading-in terminals to the moving coil, connected in series with said winding, means for reversing the direction of flux interception by said winding to induce an electromotive force therein and produce a corresponding energization of said instrument, an auxiliary source of direct current supply for energizing said instrument for the purpose of nullifying the torque of its leading-in spirals, a pair of adjustable resistance circuits by means of which such torque nullifying energy may be supplied to the instrument, means for selectively adjusting the resistances of the two circuits for different torque-nullifying results corresponding to two different deflection positions of said instrument and a switch for closing one or the other of said circuits operated simultaneously with the aforesaid reversing means.

THEODORE A. RICH.